Feb. 14, 1928.
J. SLEPIAN
1,658,948
PHASE BALANCING SYSTEM
Original Filed June 10, 1922
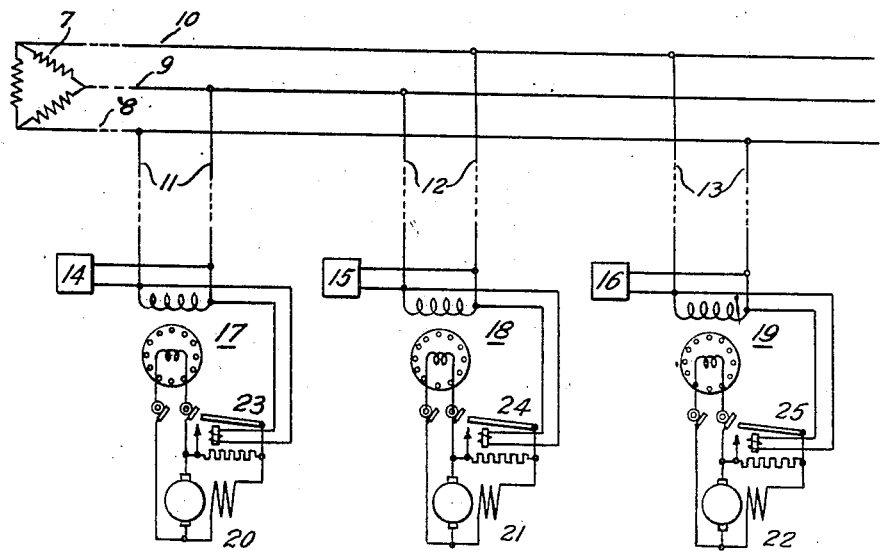
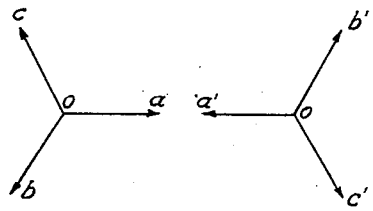
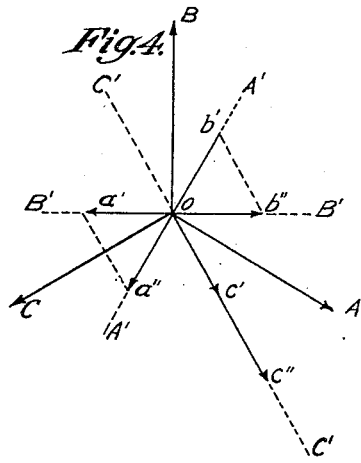
WITNESSES:
INVENTOR
Joseph Slepian
BY
ATTORNEY Patented Feb. 14, 1928.

1,658,948

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

PHASE-BALANCING SYSTEM.

Original application filed June 10, 1922, Serial No. 567,447. Divided and this application filed October 1, 1926. Serial No. 138,960.

My invention relates to phase-balancing systems and it has particular relation to such systems employing single-phase synchronous condensers for effecting a phase balance.

In an unbalanced three-phase line, if the star voltages in the respective phases could be independently regulated and all made numerically equal one to another, the line would not necessarily be balanced because the voltages would not necessarily have a 120° phase displacement. If, however, the delta voltages are made to be equal in magnitude, an equilateral triangle of electromotive forces results which assures a 120° phase displacement between the respective phases. Or, in general, if the delta single-phase components of any triangle of electromotive forces be caused to have any predetermined relationship in magnitude, the various phase relationships of the voltages are absolutely dependent upon such predetermined relationship.

One of the objects of my invention, therefore, is to provide a system wherein the respective single-phase components of the delta voltages across three line conductors of a polyphase system are independently regulated in such manner as to provide an equality or any other predetermined relationship between the magnitudes of the various single-phase delta voltages.

A further object of my invention is to provide a system of distribution comprising a balanced three-phase line having three independent single-phase loads connected thereto and three single-phase synchronous condensers connected across said loads and regulated to maintain a constant voltage.

With these and other objects in view, my invention consists in the methods and apparatus pointed out in the following description and illustrated in the accompanying drawing wherein Figure 1 is a diagrammatic view of apparatus and circuits embodying my invention in a simple form, and Figs. 2, 3 and 4 are vector diagrams illustrating the current and voltage relationships.

In the form of my invention shown in Fig. 1, a three-phase source 7 supplies power to a three-phase transmission line 8, 9 and 10. Feeders 11, 12 and 13 are connected to the various delta phases of said line to supply independent single-phase loads 14, 15 and 16, respectively, which may be sections of a single-phase railway system or systems, for example. For simplicity of illustration the step-up and step-down transformers which would ordinarily be employed in practice are not shown.

Across each of the feeders 11, 12 and 13 is connected a single-phase synchronous condenser, said condensers being diagrammatically indicated at 17, 18 and 19, respectively, and being provided with direct current exciting windings which are energized from exciters 20, 21 and 22, respectively. Any suitable form of voltage regulator is employed, as indicated at 23, 24 and 25, respectively, for holding the voltage at the terminal of each synchronous condenser at any constant predetermined value.

The operation of the system just described will best be understood by reference to Figs. 2, 3 and 4. It will be understood that the unbalanced current drawn by the three independent single-phase loads 14, 15 and 16 may be resolved into a forwardly rotating major component and a backwardly rotating minor component of balanced currents. The backwardly rotating component, which is the unbalancing component, is illustrated in Fig. 2 as a balanced system of star vectors $a$, $b$ and $c$.

In order to neutralize the unbalancing effect of the single-phase loads it is, therefor, necessary for the synchronous condensers 17, 18 and 19 to draw from the line equal and opposite currents indicated, in Fig. 3, by the vectors $a'$, $b'$ and $c'$.

If the forwardly rotating voltage vectors are represented by the star voltages $A$, $B$ and $C$, in Fig. 4, and the backwardly rotating currents are indicated by the vectors $a'$, $b'$ and $c'$, it will be seen that the respective currents are not in 90° phase relationship to the corresponding voltages. Since, however, no power is supplied to, or derived from any of the single-phase synchronous condensers 17, 18 and 19, it is evident that the current drawn thereby must bear a 90° relationship to the corresponding voltages or the star current vectors must lie in lines A'A', B'B' and C'C', respectively, which are perpendicular to the respective voltages A, B and C.

In order to cause the currents drawn by the respective machines to fall in said lines, a circulating current will be established in the delta circuit comprising the feeders 11, 12 and 13, the primary windings of the machines 17, 18 and 19 and the intervening portions of the transmission line 8, 9 and 10. The circulating current just mentioned will appear as a zero-phase-sequence current comprising vectors $a'a''$, $b'b''$ and $c'c''$ which are equal in magnitude and parallel one to another.

By taking the resultant of the vectors just mentioned and the corresponding vectors $a'$, $b'$ and $c'$, respectively, it will be found that currents $Oa''$, $Ob''$ and $Oc''$ may be drawn which are in 90° phase relationship to the corresponding voltage vectors, thus proving that the unbalanced load currents may be balanced by means of purely wattless currents drawn by the respective single-phase machines, of which one component is a zero-phase-sequence current circulating around the delta-connected primary windings of the three machines.

While I have illustrated the vectors as star vectors for facility of illustration, it is obvious that the same demonstration applies to the delta quantities, as the same vectors may be employed to form the delta diagram.

While I have described certain characteristics of my invention in detail, therefore, and while I have pointed out certain of the most obvious principles and purposes thereof, I do not intend that the language employed in the following claims shall be limited to the precise features described, but I intend that the claims shall be construed to cover all modifications which are fairly comprehended by the language thereof, when read in connection with the prior art, regardless of the details and functions mentioned in the description or illustrated in the drawing.

I claim as my invention:

1. A polyphase system comprising a polyphase generator, a polyphase transmission line associated therewith, a plurality of independently variable single-phase load devices connected across different phases of three delta phases of said transmission line, and voltage-controlling means including three single-phase variable-reactance devices connected in shunt across said delta phases of said line, and means for so varying said reactances as to maintain predetermined relative magnitudes of the three single-phase voltages of said delta.

2. A polyphase system comprising a polyphase generator, a polyphase transmission line associated therewith, a plurality of independently variable single-phase load devices connected across different phases of said transmission line at points remote from said generator, and voltage-controlling means including three single-phase variable-reactance devices connected in shunt across delta phases of said line at points remote from said generator, and means for so varying said reactances as to maintain a predetermined relation between the magnitudes of the voltages in said delta.

3. A three-phase system comprising a substantially balanced three-phase generator, a three-phase transmission line associated therewith, a plurality of independently variable single-phase load devices connected across different phases of said transmission line, three single-phase variable-reactance devices connected in shunt across delta phases of said line, and means for so varying said reactances as to neutralize the unbalancing effect of said single-phase load devices.

4. A three-phase system comprising a substantially balanced three-phase generator, a three-phase transmission line associated therewith, a plurality of independently variable single-phase load devices connected across different phases of said transmission line, three single-phase variable-reactance devices connected in shunt across delta phases of said line, and means for so varying said reactances as to maintain constant equal voltages on all of the delta phases.

5. The combination with a three-phase line subject to unbalanced conditions, of three single-phase synchronous condensers, means for connecting said condensers in delta to said line, and electro-responsive means for independently regulating said condensers for equal line voltages.

6. The combination with a three-phase line subject to unbalanced conditions, of three single-phase synchronous condensers, means for connecting said condensers in delta to said line, and electro-responsive means for independently regulating said condensers for constant line voltages.

7. The combination with a three-phase line subject to unbalanced conditions, of three single-phase synchronous dynamo-electric machines carrying substantially wattless currents, means for connecting said machines in delta to said line, and electro-responsive means for independently regulating said machines.

8. The combination with a three-phase line having a balanced supply means and unbalanced load devices drawing symmetrical negative-phase-sequence current components as well as symmetrical positive-phase-sequence current components, of means for supplying said negative-phase-sequence components, said means comprising three reactive impedance devices connected across different delta phases of said line for drawing from said line single-phase currents equal and opposite to said symmetrical negative-phase-sequence currents and circulating delta currents of such magnitude as to cause the total single-phase current in each of said impedance devices to have a predetermined power factor.

9. The combination with a three-phase line having a balanced supply means and unbalanced load devices drawing symmetrical negative-phase-sequence current components as well as symmetrical positive-phase-sequence current components, of means for supplying said negative-phase-sequence current components, said means comprising three reactive impedance devices connected across different delta phases of said line and electro-responsive regulators associated with said impedance devices for maintaining relatively equal single-phase voltages, whereby said impedance devices draw from said line single-phase currents equal and opposite to said symmetrical negative-phase-sequence currents and circulating delta currents of such magnitude as to cause the total single-phase current in each of said impedance devices to have a predetermined power factor.

In testimony whereof, I have hereunto subscribed my name this 29th day of September, 1926.

JOSEPH SLEPIAN.